(Model.)
G. W. KORN.
POCKET KNIFE HANDLE.
No. 306,840. Patented Oct. 21, 1884.
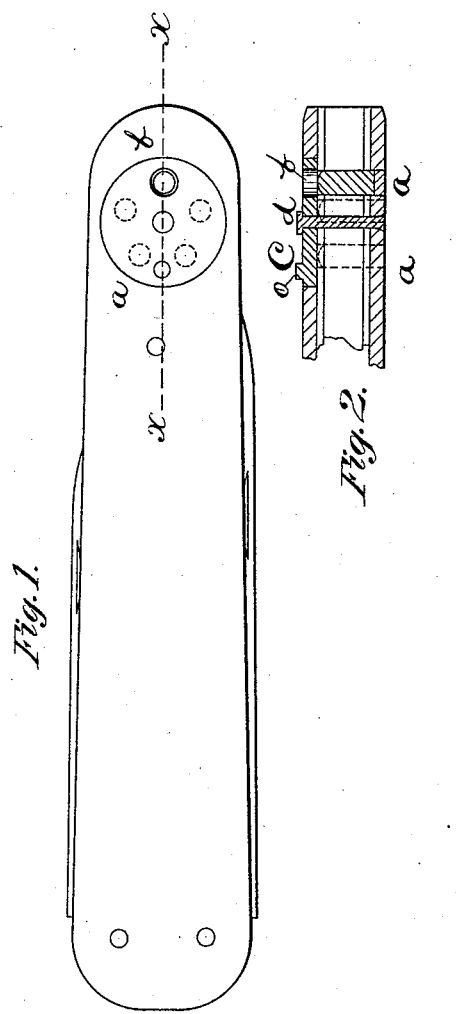
Witnesses
J. P. McElroy
A. M. Griffen
Inventor
Geo. W. Korn
By Jas. A. Cowles
Attorney

UNITED STATES PATENT OFFICE.

GEORGE W. KORN, OF NEW YORK, N. Y.

POCKET-KNIFE HANDLE.

SPECIFICATION forming part of Letters Patent No. 306,840, dated October 21, 1884.

Application filed October 25, 1883. (Model.)

*To all whom it may concern:*

Be it known that I, GEORGE W. KORN, a citizen of the United States, residing at the city of New York, in the State of New York, have invented certain new and useful Improvements in Pocket-Knife Handles, of which the following is a specification.

The nature and object of this invention is to provide a pocket-knife handle with a revolving disk having a single aperture therein, and locating the same over a series of pictured lenses arranged in a circular form, whereby the eye rests upon a single lens only.

Figure 1 shows a plan view. Fig. 2 shows a sectional view through line x x of Fig. 1.

a a a are pictured lenses grouped in a circle in the end of a knife-handle, which is made longer sufficiently for this purpose than ordinarily. These lenses are placed in holes in the end of the knife-handle made for that purpose. At one side over the lenses a portion of the handle is cut away in circular form, and within which is placed the disk C, which revolves upon the central pin, d. In this is the single aperture or hole b. o is a slight projection on the disk to facilitate turning it. As the disk C is revolved the hole b is made to register in turn with the various lenses a a a, thus exposing to the eye only a single lens. In this construction several lenses can be grouped together at the end of the knife-handle, and but one will be exposed to view, thus avoiding all confusion and mingling of views.

I claim—

As an article of manufacture, a knife-handle provided with a revolving disk having a single aperture therein, said disk being placed over a series of pictured lenses arranged in circular form, as and for the purpose shown.

GEORGE W. KORN.

Witnesses:
J. P. McELROY,
F. J. GRIFFIN.